No. 741,195. PATENTED OCT. 13, 1903.
M. VOELKER.
SCOOP.
APPLICATION FILED DEC. 23, 1902.
NO MODEL.
FIG. 1.
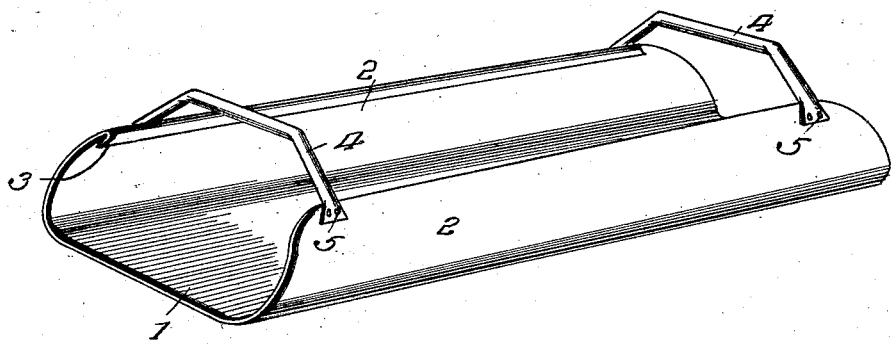
FIG. 2.
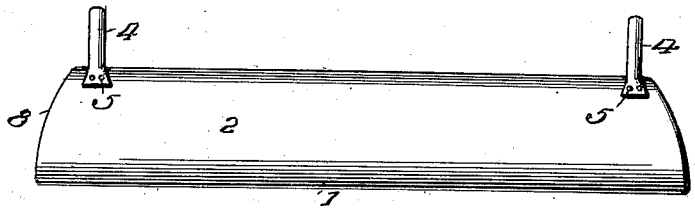
FIG. 3.
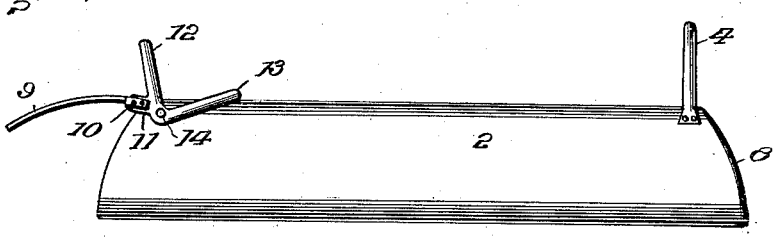
FIG. 4.
Witnesses
Wm J Jacobi
N. Arthur Budd
Inventor
Matt Voelker
By
W. J. Fitzgerald
Attorneys No. 741,195. Patented October 13, 1903.

UNITED STATES PATENT OFFICE.

MATT VOELKER, OF WATERLOO, WISCONSIN.

SCOOP.

SPECIFICATION forming part of Letters Patent No. 741,195, dated October 13, 1903.

Application filed December 23, 1902. Serial No. 136,400. (No model.)

*To all whom it may concern:*

Be it known that I, MATT VOELKER, a citizen of the United States, residing at Waterloo, in the county of Jefferson and State of Wisconsin, have invented certain new and useful Improvements in Scoops; and I do hereby declare the following to be a full, clear, and exact description of the invention, such as will enable others skilled in the art to which it appertains to make and use the same.

My invention relates to certain new and useful improvements in scoops, which while useful for a great variety of purposes will be found especially desirable as a grain-scoop, as will be hereinafter fully described, and pointed out in the claims.

The prime object of my invention, among others, is to provide a grain-scoop which will be found very desirable for handling grain in large quantities inasmuch as the grain may be readily lifted from a pile or bin by one end of the scoop and discharged therefrom at the other end into a sack or other receptacle.

Other objects and advantages will be hereinafter made clearly apparent, reference being had to the accompanying drawings, which are made a part of this application, and in which—

Figure 1 is a perspective view of my invention complete. Fig. 2 shows a side elevation of my improved scoop. Figs. 3 and 4 illustrate a modified construction.

For convenience in referring to the various details of my invention and elements deemed necessary to coöperate therewith numerals will be employed, the same numeral applying to a similar part throughout the several views.

In materializing my invention I provide the body portion of my scoop preferably from suitable sheet metal of any desired variety bent and shaped so as to provide the bottom section 1 and the parallel and curved side walls 2, as clearly shown. The extreme upper edges of the side walls are preferably bent so that their free upper edges will be turned inward to provide the overhanging lip-section 3, designed to prevent the grain from casually slipping out of the filled scoop, or said edge or lip 3 may be bent snugly against the side walls, if preferred.

For convenience in handling the scoop and its contents I provide, preferably, at each end thereof a handle 4, formed substantially as shown in Fig. 1 and designed to reach upward a proper distance to clear the contents of the scoop, said handles being secured in place in any preferred way, as by the rivets 5 or equivalent.

It will be understood that the extreme ends of the side walls 2 may be shaped in any preferred manner, either extended straight up, but preferably shaped so as to present the curved terminals 8, as shown in all the views. The inwardly-directed lip 3, carried by or forming an integral part of the upper edge of the side walls 2, will when shaped as shown in Fig. 1 be desirable in holding the grain or other contents of the scoop against casually slipping over said side walls, though offering no obstruction or impediment to the free discharge of the contents of the scoop from either end thereof. Said lip-sections 3, however, instead of standing out of contact or slightly away from the side walls may, if preferred, be bent directly in contact with such walls, thus leaving it to the manufacturer as to which form of construction may be adopted, it being understood that I wish to reserve the right to use either form or disposition of said lips as I may in practice find most desirable.

It is obvious that my improved scoop will be found very useful and efficient for lifting grain or the like and enabling it to be quickly discharged into any suitable receptacle, as a grain-bag, inasmuch as the grain or other contents of the scoop will be entered at one end and quickly discharged from the other end without the necessity of turning the scoop, such discharge of contents being effected by a proper manipulation of the scoop, as will be readily understood. As both ends of the scoop are left open and free either for the reception and discharge of the grain or other commodity, the work of handling grain is very greatly facilitated thereby, while the labor incident to the handling of the grain is reduced to a minimum, thereby making it possible to handle larger quantities of grain than could be done if it were necessary to turn the scoop bodily around each time it was to be discharged or emptied after filling. A further obvious advantage arising from the use of my improved scoop is due to the fact that the inside measurement throughout the length of the scoop is uniform. Consequently there is no constriction or wedging at either end, and it follows that all unnecessary friction is wholly eliminated.

While the form of construction to be adopted in materializing my improved scoop, as hereinbefore described, will, it is thought, be found sufficient to meet all requirements, I desire the right in some instances to provide an end closure or lid for my scoop if I should find it desirable so to do, and in some cases I will therefore provide the lid-section or closure 9, rigidly connected at its upper edge in any preferred way, as by means of the ears 10, to the lugs 11, carried by the handle 12, said handle constituting an integral part of the auxiliary handle 13, both of them being pivotally connected to the upper edges of the said walls 2, as indicated by the numeral 14. It is therefore clearly apparent that since the closure-section 9 is rigidly secured to the lugs 11 such closure will be elevated, as shown in Fig. 3, when the handle 12 is brought into a substantially vertical position, as will be the case when the scoop is lifted by said handle. When, therefore, the end of the scoop having the lid-section or closure 9 is to be filled with grain, the handle 12 is grasped, which will automatically swing the lid 9 upward and permit the free introduction of the grain into the scoop without in any wise contacting with said lid, and when the end of the scoop is thus filled the operator will grasp the handle 13, which, swinging into a position directly above the pivot-point 14, will instantly close the lid-section 9 and hold it tightly against the mouth of the scoop, and thereby secure the contents in the scoop and permit the same to be freely and completely discharged from the opposite end thereof.

It will be understood that my improved scoop may be made any preferred size and of any material deemed suitable for such purpose, and while I have described the preferred construction and combination of parts deemed necessary in carrying out my invention I wish to comprehend all substantial substitutes and equivalents that may be considered as falling fairly within the scope of my invention.

Having thus described the construction and manner of using my improved scoop for grain or the like, further reference to the details is deemed unnecessary.

What I claim as new, and desire to secure by Letters Patent, is—

1. As an article of manufacture, a grain-scoop comprising a body portion formed with a bottom section 1, parallel side walls 2 extending upwardly from said section 1, each of said side walls being provided with an inwardly and downwardly directed lip or terminal 3, adapted to hold the contents against lateral movement, a scooping edge at each end of said body portion, and suitable handles located at a proper point upon the scoop thus formed, whereby said scoop may be swung to the right or left to gather the grain and empty the same into the receptacle without reversing the ends of said scoop, substantially as and for the purpose set forth.

2. The herein-described grain-scoop, comprising the body portion 1 and parallel side walls 2, provided with a scooping edge at both ends; an inwardly-directed lip 3 for each wall extending downwardly at an oblique angle thereto, said lips being adapted to hold the contents of the scoop against lateral movement; a lid pivotally secured to one end of said body and a controlling-handle for said lid whereby one end of said scoop may be closed, all combined as set forth.

3. The herein-described grain-scoop comprising the body portion 1 and side walls 2, provided with a scooping edge at both ends; an inwardly-directed lip 3 for each wall extending downwardly at an oblique angle thereto, said lips being adapted to hold the contents of the scoop against lateral movement; a handle rigidly secured to one end of the scoop and a pair of integrally-formed handles pivotally connected to the opposite end, the outer pivoted handle having lugs 11 and a closure secured to said lugs whereby said closure may be operated, substantially as and for the purpose set forth.

In testimony whereof I affix my signature in presence of two witnesses.

MATT VOELKER.

Witnesses:
T. A. WILLIAMS,
WM. BLASCHKA.